(12) United States Patent
Hayot et al.

(10) Patent No.: US 9,687,999 B2
(45) Date of Patent: Jun. 27, 2017

(54) METHOD FOR MANUFACTURING SHEETS FROM THE STEM OF THE BANANA PLANT, AND SHEET PRODUCED BY SUCH A METHOD

(75) Inventors: Vladimir Hayot, Ducos (FR); Nicolas Cheminon, Ducos (FR)

(73) Assignee: FIB & CO., Ducos (FR)

( * ) Notice: Subject to any disclaimer, the term of this patent is extended or adjusted under 35 U.S.C. 154(b) by 470 days.

(21) Appl. No.: 14/232,204

(22) PCT Filed: Jul. 12, 2012

(86) PCT No.: PCT/EP2012/063739
§ 371 (c)(1),
(2), (4) Date: Jan. 10, 2014

(87) PCT Pub. No.: WO2013/007803
PCT Pub. Date: Jan. 17, 2013

(65) Prior Publication Data
US 2014/0141208 A1    May 22, 2014

(30) Foreign Application Priority Data
Jul. 13, 2011  (FR) ...................... 11 56440

(51) Int. Cl.
*B32B 37/18* (2006.01)
*B27L 5/06* (2006.01)
(Continued)

(52) U.S. Cl.
CPC .............. *B27N 3/08* (2013.01); *B27D 1/04* (2013.01); *B27J 7/00* (2013.01); *B27L 5/02* (2013.01); *B27M 1/02* (2013.01); *B32B 21/13* (2013.01); *B27L 5/06* (2013.01); *B27M 1/08* (2013.01); *B27N 3/086* (2013.01); *B32B 21/14* (2013.01);
(Continued)

(58) Field of Classification Search
CPC .... B27J 7/00; B27L 5/06; B27M 1/02; B27M 1/08; B27N 3/086; B32B 37/0076; B32B 37/142; B32B 37/18; B32B 2037/0092; B32B 43/00; B32B 2451/00; B32B 38/0004; B32B 38/04; B32B 2038/045; B32B 2038/166; B32B 21/00; B32B 21/13; B32B 21/14; Y10T 156/1062; Y10T 156/1075; Y10T 156/13; Y10T 428/192
See application file for complete search history.

(56) References Cited

U.S. PATENT DOCUMENTS 2,409,785 A * 10/1946 Newmark ................ B27D 1/04
144/348
2,660,548 A    11/1953 Soehner
(Continued)

FOREIGN PATENT DOCUMENTS

CN       001380166        * 11/2002
FR       1 460 600 A        3/1966
WO   WO 2006/029469        3/2006

*Primary Examiner* — Linda L Gray
(74) *Attorney, Agent, or Firm* — Muncy, Geissler, Olds & Lowe, P.C.

(57) ABSTRACT

The invention relates to a method for manufacturing a sheet from the pseudostem of the banana plant, including the steps of: cutting out a beam from a central portion of the pseudostem; cutting leaves from the beam; forming a sheet by assembling the leaves such that the latter overlap over a predetermined width; and pressing the resulting sheet.

9 Claims, 1 Drawing Sheet

(51) Int. Cl.
*B27M 1/08* (2006.01)
*B32B 38/04* (2006.01)
*B32B 38/16* (2006.01)
*B32B 21/14* (2006.01)
*B32B 21/13* (2006.01)
*B27N 3/08* (2006.01)
*B27D 1/04* (2006.01)
*B27J 7/00* (2006.01)
*B27L 5/02* (2006.01)
*B27M 1/02* (2006.01)
*B32B 37/00* (2006.01)
*B32B 38/00* (2006.01)

(52) U.S. Cl.
CPC .......... *B32B 37/0076* (2013.01); *B32B 37/18* (2013.01); *B32B 38/0004* (2013.01); *B32B 38/04* (2013.01); *B32B 2038/166* (2013.01); *Y10T 156/1062* (2015.01); *Y10T 156/1075* (2015.01); *Y10T 156/13* (2015.01); *Y10T 428/192* (2015.01); *Y10T 428/24752* (2015.01)

(56) References Cited

U.S. PATENT DOCUMENTS

| | | | | |
|---|---|---|---|---|
| 2,956,307 | A | * 10/1960 | Fahrni | B27N 3/20 264/297.4 |
| 3,981,338 | A | 9/1976 | Jones | |
| 4,930,556 | A | 6/1990 | Prihoda | |
| 5,662,760 | A | 9/1997 | Tsuda | |
| 2004/0250508 | A1 | 12/2004 | Lam | |
| 2006/0027319 | A1 | 2/2006 | Abe | |
| 2009/0120597 | A1* | 5/2009 | Azer | D21B 1/00 162/48 |

* cited by examiner

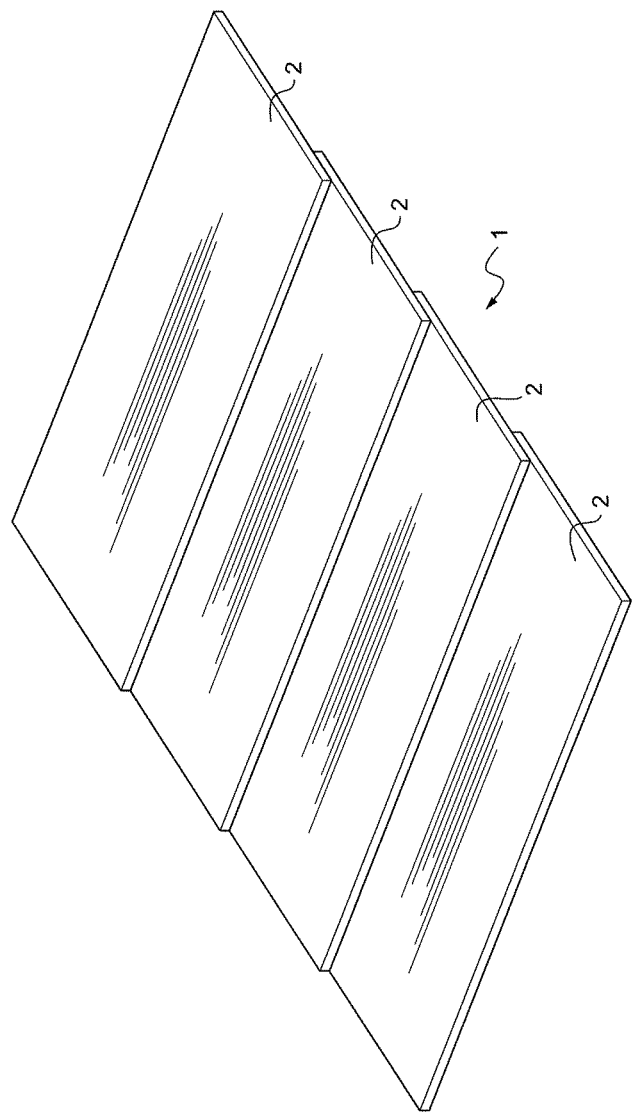

METHOD FOR MANUFACTURING SHEETS
FROM THE STEM OF THE BANANA PLANT,
AND SHEET PRODUCED BY SUCH A
METHOD

The invention relates to a method for making sheets obtained from banana pseudo stems and to the sheets thus obtained. These sheets may notably be used as sheets of veneer or other decorative covering.

BACKGROUND OF THE INVENTION

The recent craze for decoration has increased the demand for new decorative materials, particularly natural materials. Moreover, the consumer is increasingly concerned for the environment and favours recyclable materials obtained using non-polluting methods without chemical additives and a fortiori the manufacture of which allows the waste to be recycled or put to good use.

The growing of bananas generates a significant amount of biomass which is exploited little if at all. Indeed, after the bunch of bananas has been harvested, the pseudo stem is cut down and, because it has no intrinsic value, is generally left on the plantation. The rotting-down of the banana pseudo stems on the ground increases the spread of parasites and disease. Thus, solutions for putting banana plantation waste to good use are sought.

For example, it is known practice to use banana pseudo stem fibres in the production of paper. Thus, patent application WO 2006/029469 describes a method that makes it possible to obtain "sheets" that can be used notably for the making of paper or other papermaking products by unwinding the banana pseudo stem. The "sheets" thus obtained are continuous. They have a width and a length that are determined respectively by the height and the diameter of the pseudo stem used.

This method applies conventional techniques used for producing sheets from a tree trunk to a banana pseudo stem, the make-up, mechanical properties and water content of which are very different, banana pseudo stems notably being softer with a higher water content. Use of the method therefore demands perfect control over these techniques in order to arrive at the expected results.

OBJECT OF THE INVENTION

With the invention, it is proposed that banana waste and, in particular, banana pseudo stems, be used to produce, simply and as ecologically as possible, a new material that can be used for decorative purposes.

Thus, the invention proposes an ecological method for the customized (to variable dimensions and patterns) production of sheets, notably sheets that can be used for veneer, obtained from banana pseudo stems and without the addition of chemical products. The invention also relates to the sheets obtained using the method that is the subject of the invention.

SUMMARY OF THE INVENTION

More specifically, the invention relates to a method for making sheets from banana pseudo stem, comprising the following steps:
cutting a beam from a central portion of the banana pseudo stem,
slicing the beam into strips (or lamellae),
laminating in a rolling mill the strips thus obtained,
forming a sheet by assembling the strips in such a way that they overlap over a predetermined width,
pressing and drying the sheet thus obtained.

Thus, the banana pseudo stem is not "unrolled" but sliced to obtain strips (or lamellae) assembly of which allows the formation of a sheet. Assembly is performed by pressing the overlapping portions of the strips against one another thus causing the strips to join together without recourse to external addition of adhesive. This method therefore relies on a principle that is particularly simple.

The invention also relates to the sheets of veneer obtained by assembling strips of banana pseudo stem.

Other features and advantages of the invention will emerge from reading the following description of one particular non limiting embodiment of the invention.

BRIEF DESCRIPTION OF THE DRAWINGS

Reference will be made to the attached single FIGURE which is a perspective depiction of a sheet according to the invention.

DETAILED DESCRIPTION OF THE INVENTION

Banana plants (*Musa* spp.) are monocotyledon plants grown in inter-tropical regions. These are non-ligneous herbaceous plants which may attain a height of several meters. The pseudo stem consists of the mass of leaf stalks. The heart of the pseudo stem is itself made up of the floral stalk which will later give rise to the bunch of bananas. After the bunch of bananas has been harvested, the banana plant is cut down. The pseudo stem can then be converted using the method that forms the subject of the invention.

According to the method of the invention, a beam is cut from the heart of the pseudo stem. Cutting can be done by any means, preferably using a circular saw machine. Other cutting means may also be used such as a knife, a bandsaw and other blades, as well as any means capable of cutting a beam from the pseudo stem.

Thus, for preference, the beam will be cut in the lengthwise direction of the heart of the pseudo stem. The length of the beam therefore corresponds to the length of the pseudo stem. The beam has a rectangular cross section with a longer dimension corresponding substantially to the diameter of the pseudo stem and a shorter dimension corresponding substantially to the cutting width. The cutting lines are centred with respect to the pseudo stem so that the beam thus obtained can be inscribed inside the heart. The beam is obtained by successive cuts of the pseudo-stem of the banana plant such that on each pass, the position of the cutting line is optimized to maintain a beam of square or rectangular cross section with optimal dimensions which is inscribed inside the heart of the pseudo-stem. The sides or slabs are thus successively removed by a succession of cuts. For preference, the shortest dimension is less than 70 mm and, for preference, is between about 45 and 60 mm.

An alternative form of the method of the invention is to cut the beam obtained in the previous step in such a way as to obtain a beam of square cross section with a side length of between around 45 and 60 mm.

The beams thus obtained, whether of rectangular or square cross section, are then placed on a support that allows strips to be sliced by cutting the beam. The strips are sliced one by one, in successive passes of the blade. This ensures a more even strip thickness and potentially makes it possible to alter the thickness from one strip to another. The slicing is preferably done longitudinally using a system of blades.

The strips are the same length as the beam, and also the same width, and are less than 10 mm thick, and preferably between 1 and 4 mm thick. Having beams of rectangular or square cross section makes it possible, during the slicing step, to obtain strips with perfectly identical lengths and widths and thicknesses that are also identical but may also vary.

According to a preferred embodiment of the invention, the strips are then passed through a rolling mill in order to extract a juice therefrom. A number of passes through the rolling mill may be effected, in order to extract the maximum of juice. This step is particularly important as it gives the strips a certain degree of mechanical integrity. This prevents the strips from becoming torn or damaged during the successive handling operations of the assembly step.

After rolling, the strips are combined with one another in such a way that they overlap over a predetermined zone.

As illustrated in the FIGURE, a "sheet" (1) is defined as the assembly formed by strips (2), and thus assembled with one another.

A sheet may be made up of strips positioned parallel to one another with at least one edge overlapping one edge of an adjacent strip. For preference, the region of overlap is less than 10 mm.

It is also possible for the strips to be placed perpendicular to one another so as to create a basket-weave effect. The region of overlap then corresponds to the width of the strip.

Of course, the strips may equally well be positioned in such a way that they form a different type of pattern, such as an ear of corn pattern, or a design. The pattern or the design needs to be formed in such a way that each strip overlaps another strip over a total surface area in excess of 1 cm$^2$. As the strips obtained according to the invention have identical lengths and widths, the patterns obtained are very regular. According to the techniques conventionally used, it is of course possible to obtain sheets from several different plant species so that shades of colour can be created.

The dimensions of the sheets obtained can be adapted to suit the use. As standard, the dimensions of the sheets produced according to the invention are 130 cm×350 cm.

For preference and so as to obtain better quality sheets, the strips are assembled on a rigid plate and then covered with an absorbent layer. A ten plate-sheet-layer assemblies are stacked then pressed in a press so as to fix the assembly of strips and extract the residual moisture, which is absorbed by the absorbent layer. The absorbent layer may be made of any absorbent material, which may be a cotton cloth or fabric, a sheet of paper or any other substance able to absorb moisture.

Alternatively, each strip can be pressed individually.

The strips are assembled without the addition of adhesive.

The sheets thus obtained are then dried. Drying definitively fixes the assembly. The drying may be the result of the previous pressing operation and/or involve an additional drying step.

The sheets obtained according to the invention are relatively flexible and can be used as sheets of covering. They also have a pattern which is perfectly regular because of the identical dimensions of each strip.

The sheets, according to the invention, made of strips of banana pseudo stem can be used as sheets of veneer on furniture or decorative items.

Depending on the end-use, it is possible for the sheets obtained to be mounted on a backing fabric so as to stiffen them or allow them to be used as a wall covering.

It is also possible to apply a varnish or protective treatment to them.

According to the invention, the sheets thus obtained can be stuck to a backing so that, for example, they can be used as floor covering.

The sheets obtained according to the invention may be translucent when the thickness of the strips is less than 5 mm. These sheets can then be used for example to create blinds, lamp-shades or any other object that requires the passage of light.

Of course, the invention is not restricted to the embodiment described but on the contrary encompasses any variant that falls within the scope of the invention as defined by the claims.

The invention claimed is:

1. A method for making a sheet from banana pseudo stem, comprising the steps of:
    cutting a beam from a central portion of the pseudo stem in order for the beam being inscribed inside a heart of the pseudo stem,
    removing successively sides of the beam by a succession of cuts,
    slicing the beam into strips,
    laminating in a rolling mill the strips thus obtained,
    forming a sheet by assembling the strips in such a way that they overlap over a predetermined width, and
    pressing and drying the sheet thus obtained.

2. The method for making a sheet from banana pseudo stem according to claim 1, wherein the sliced strips are less than 10 mm thick.

3. The method for making a sheet from banana pseudo stem according to claim 1, wherein the strips that make up the sheet are assembled on a rigid plate and covered with an absorbent cloth.

4. The method according to claim 1, comprising the steps of:
    a. cutting the beam from the central portion of the pseudo-stem, using successive passes of a blade,
    b. cutting the strips, one by one, from the beam,
    c. passing the strips through a rolling mill to extract juice from the strips,
    d. forming the sheet on a rigid plate by assembling the strips in such a way that they overlap over a determined width,
    e. adding the absorbent layer to the sheet thus formed, and
    f. pressing and drying the sheet after the absorbent layer was added.

5. The method according to claim 4, in which the pressing is performed simultaneously for a plurality of the sheets each placed between the rigid plate and the absorbent layer.

6. The method according to claim 1, wherein the beam is of rectangular or square cross section.

7. A sheet obtained from banana pseudo stem, wherein it comprises assembled banana pseudo stem strips in accordance with claim 1.

8. A sheet according to claim 7, wherein the strips comprise superposed parts overlapping by at least 5 mm.

9. A sheet according to claim 8, wherein it is a sheet of veneer.

* * * * *